United States Patent [19]
Fowler

[11] 3,980,565
[45] Sept. 14, 1976

[54] CELL HAVING CATALYTIC LAYER FOR COALESCING OIL DROPLETS
[76] Inventor: Leslie L. Fowler, 1722 E. 59th St., Tulsa, Okla. 74105
[22] Filed: Nov. 26, 1971
[21] Appl. No.: 202,378

[52] U.S. Cl. .......................... 210/489; 210/494 R; 210/DIG. 5
[51] Int. Cl.² ........................................ B01D 27/00
[58] Field of Search ................ 210/DIG. 5, DIG. 1, 210/489–494, 502–505; 427/422; 428/242

[56] References Cited
UNITED STATES PATENTS

| | | | |
|---|---|---|---|
| 2,873,219 | 2/1959 | Brennan | 427/422 X |
| 2,893,561 | 7/1959 | Duzich | 210/504 X |
| 3,016,345 | 1/1962 | Price | 210/DIG. 5 |
| 3,224,592 | 12/1965 | Burns et al. | 210/DIG. 1 |
| 3,231,091 | 1/1966 | Kingsbury et al. | 210/DIG. 5 |
| 3,778,241 | 12/1973 | Winter et al. | 161/87 |

FOREIGN PATENTS OR APPLICATIONS 566,795  12/1958  Canada ............................. 210/490

Primary Examiner—John Adee
Attorney, Agent, or Firm—Head, Johnson & Chafin

[57] ABSTRACT

A cell having a catalytic layer for coalescing oil droplets dispersed in a water emulsion including an elongated perforated core in which the emulsion is injected, a layer of emulsion breaking fibrous material wound about the core through which the emulsion passes, and a catalytic layer of porous material wound about the layer of fibrous material, the catalytic layer being formed of a porous flexible substrate having sprayed on particles of molten metal.

3 Claims, 3 Drawing Figures

U.S. Patent   Sept. 14, 1976   3,980,565
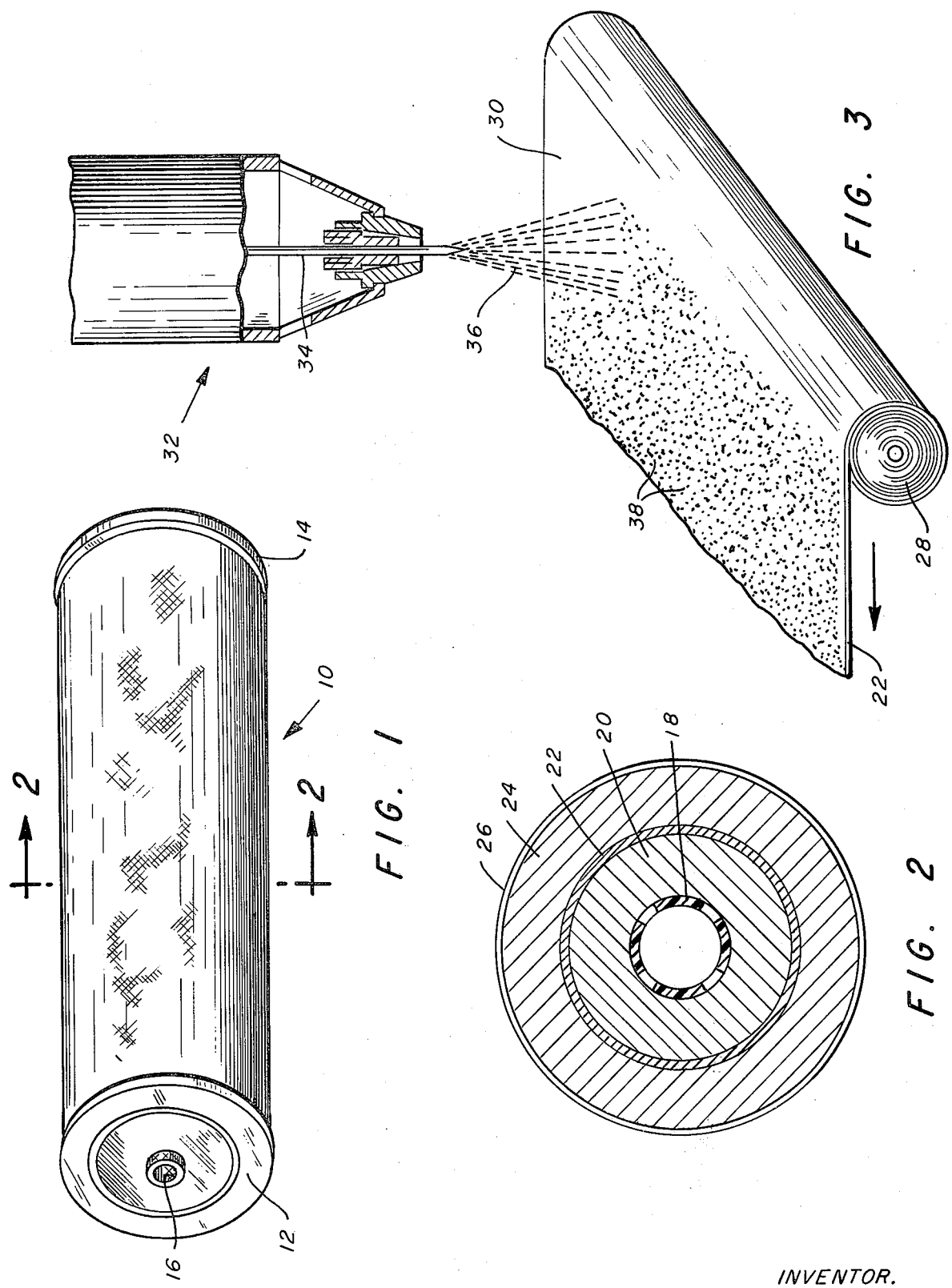

CELL HAVING CATALYTIC LAYER FOR COALESCING OIL DROPLETS

BACKGROUND AND SUMMARY OF THE INVENTION

The use of cells of fibrous material to coalesce dispersed oil droplets in a water emulsion is a known procedure, particularly in the petroleum industry. In a typical cell for this purpose the emulsion is passed through one or more layers of fibrous material having the characteristic that oil droplets cling to the fibrous material while water passes more freely, the oil droplets growing in size as they are contacted by other oil droplets until the size of the oil droplets become such that the flow of fluid breaks the surface tension between the fibrous material and the oil droplets, causing the oil droplets to pass to the exterior of the fibrous material. On the exterior surface of the cell the droplets continue to grow in size to form globules and when a globule reaches a size sufficient to overcome surface tension it rises to the surface of the water surrounding the cell where the oil accumulates and is drawn off. Water is withdrawn from the bottom of the cell. As an illustration of a coalescing cell in this manner may be seen by referring to my copending application entitled "Filter Cell Having Catalytic Material Therein" filed concurrently herewith.

OBJECTS OF THE INVENTION

This invention is directed to improvements in a coalescing cell for separating oil dispersed in a water emulsion.

It is therefore a basic object of this invention to provide an improved oil coalescing cell for use in an oil-water separator.

Still more particularly, an object of this invention is to provide a cell for separating oil in a water emulsion including provision of a catalytic means for enhancing the rate of coalescing of finely dispersed oil droplets.

These general objects, as well as more specific objects, will be fulfilled in the following description and claims, taken in conjunction with the attached drawings.

DESCRIPTION OF THE VIEWS

FIG. 1 is an isometric view of a typical coalescing cell embodying the principles of this invention.

FIG. 2 is a cross-sectional view taken along the line 2—2 of FIG. 1.

FIG. 3 is a diagrammatic view showing means of manufacturing material as utilized in the formation of a coalescing cell, the material providing catalytic action for enhancing the effectiveness of the cell for separating oil from water.

DETAILED DESCRIPTION

Referring to the drawings, and first to FIGS. 1 and 2, a coalescing cell as it typically appears is illustrated. The cell 10 includes end caps 12 and 14 of stiff impervious material. End cap 12 includes a central opening 16 which communicates with a hollow perforated core tube 18. Wound about core tube 18 is a layer of emulsion breaking fibrous material 20. While a single layer 20 is shown the fibrous material may well be a plurality of layers, and the layers may have variable compositions and variable densities.

Wound on the fibrous layer 20 is a catalytic layer of porous material 22. The layer 22 is formed of a porous flexible substrate having been sprayed with particles of molten metal.

Wound on the exterior of catalytic layer 22 is a second layer of emulsion breaking fibrous material 24. Layer 24 may, like layer 20, be formed of a plurality of layers of varying compositions and densities. An outer layer 26 is placed upon the exterior of second layer 24 to complete the cell. The outer layer 26 may be such as a cotton sock, fiberglass webbing, or so forth, to add strength to the cell and to form a final layer at which the oil droplets accumulate into globules before rising to the surface of the emulsion.

It is to be emphasized that the specific arrangement of the layers of material making up the cell 10 may vary considerably. The essence of the invention is not in the specific sequence of the layers of material but in the utilization of a catalytic layer of porous material sprayed with particles of molten metal and, in a more limited sense, the combination of at least one layer of emulsion breaking fibrous material and at least one catalytic layer of porous material formed of a porous flexible substrate having particles of molten metal thereon.

The catalytic layer 22 is formed, as previously indicated, of porous material sprayed with particles of molten metal. FIG. 3 shows a diagrammatic arrangement for manufacturing such material. A roll of porous substrate 28 is unwound presenting a surface 30 to be treated. A frame spraying gun 32 is aimed at surface 30. Flame spraying gun 32 is of the type typically used in metalizing or flame-spray processing. Flame-spraying is a process whereby metallic material is brought to its melting point and sprayed onto a surface to produce a coating. This flame spraying process is sometimes referred to as metalizing, and includes plasma spraying. Generally, flame spraying utilizes a wire 34 of the metal to be deposited which is passed through gun 32 in the presence of heat provided by oxygen and acetylene or oxygen and propane. Compressed air is utilized to cool the gun and to carry the molten metal to the surface being treated. The metal of the wire 34 is heated to molten temperature and carried by the burning gas and compressed air as an atomized spray 36 of molten metallic particles. These molten particles 38 deposit upon surface 30 of the porous substrate 22 and solidify. Since the particles are molten or at least semi-molten upon striking surface 30, they readily adhere to the surface as they solidify. Thus the surface 30, after being treated with molden metal particles 38, forms a porous material through which fluid may pass, but in an arrangement in which the fluid is subjected to the metallic particles 38.

It has been learned that the presence of metallic particles 38 functions in a catalytic way to cause finely dispersed oil droplets to more readily adhere to each other, that is coalesce, to form larger droplets which ultimately grow into globules on the exterior of the cell 10 and rise in the water in which the cell is utilized to the surface of the water to be drawn off. While the specific reason the metallic particles 38 function to improve the effectiveness and rate of efficiency of coalescing oil droplets is not precisely known, it appears that the metallic particles form nuclei about which oil droplets form as they grow in size. As the droplets grow to sufficient size they are finally carried by the flow of emulsion through the cell to break loose and pass through the cell, growing in size until they reach the exterior of the cell to form globules.

The metal particles 38 which is sprayed on and adhered to the substrate 22 includes particles of molten copper, tin, aluminum, nickel, zinc and alloys and mixtures of these metals. The substrate 22 may be material such as cloth, filter paper, felt, woven glass or batts of bonded fiber.

The molten particles 38 may be sprayed on at varying densities, however, the density must not be such as to cause the substrate to become nonporous.

The invention has been described with a certain degree of particularity, however, it is manifest that many changes may be made in the details of construction and the arrangement of components without departing from the spirit and scope of this disclosure. It is understood that the invention is not limited to the specific embodiment set forth herein for purposes of exemplification, but is to be limited only by the scope of the attached claim or claims, including the full range of equivalency to which each element or step thereof is entitled.

What is claimed is:

1. A cell having a catalytic layer for coalescing oil droplets dispersed in a water emulsion comprising:
    an elongated perforated core into which the emulsion is injected;
    a layer of emulsion breaking fibrous material wound about said core through which the emulsion is forced to pass; and
    a catalytic layer of porous material wound about said layer of fibrous material, said catalytic layer being formed of a porous flexible substrate and a layer of metal particles adhered to the porous substrate, the metal particles being selected from the class consisting of copper, tin, aluminum, nickel, zinc and alloys and mixtures thereof.

2. A cell for coalescing oil droplets dispersed in a water emulsion according to claim 1 including:
    a second layer of emulsion breaking fibrous material, said second layer being wound about said catalytic layer.

3. A cell for coalescing oil droplets dispersed in a water emulsion according to claim 1 wherein said catalytic layer is formed of porous flexible material selected from the class consisting of cloth, filter paper, felt, woven glass and batts of bonded fibers.

* * * * *